(12) United States Patent
Suwa et al.

(10) Patent No.: US 8,873,112 B2
(45) Date of Patent: Oct. 28, 2014

(54) IMAGE PROCESSING APPARATUS AND DETERMINATION METHOD

(75) Inventors: Tetsuya Suwa, Yokohama (JP); Minako Kato, Kawasaki (JP); Yugo Mochizuki, Kawasaki (JP); Takashi Nakamura, Yokohama (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/609,730

(22) Filed: Sep. 11, 2012

(65) Prior Publication Data

US 2013/0100504 A1   Apr. 25, 2013

(30) Foreign Application Priority Data

Oct. 21, 2011   (JP) ................. 2011-232115

(51) Int. Cl.
| | | |
|---|---|---|
| H04N 1/04 | (2006.01) | |
| G06K 15/00 | (2006.01) | |
| G06K 9/46 | (2006.01) | |
| G06K 9/50 | (2006.01) | |
| G06K 9/48 | (2006.01) | |
| H04N 1/387 | (2006.01) | |
| G06K 9/20 | (2006.01) | |
| H04N 1/00 | (2006.01) | |
| H04N 1/38 | (2006.01) | |
| H04N 1/46 | (2006.01) | |

(52) U.S. Cl.
CPC .................. *G06K 9/20* (2013.01); *H04N 1/387* (2013.01); *G06K 9/4638* (2013.01); *H04N 1/00681* (2013.01); *H04N 1/00816* (2013.01); *H04N 1/38* (2013.01); *H04N 1/46* (2013.01)

USPC ........... 358/474; 358/3.1; 358/1.18; 382/195; 382/190; 382/201; 382/197

(58) Field of Classification Search
USPC ........................................... 358/474, 518, 3.1
See application file for complete search history.

(56) References Cited

U.S. PATENT DOCUMENTS

| | | | |
|---|---|---|---|
| 5,508,823 | A | 4/1996 | Kiyohara et al. |
| 5,808,600 | A | 9/1998 | Mochizuki |
| 5,881,214 | A | 3/1999 | Morisawa et al. |
| 7,699,423 | B2 | 4/2010 | Suwa et al. |
| 7,881,524 | B2 | 2/2011 | Matsugu et al. |
| 2007/0097438 | A1* | 5/2007 | Sato ............................... 358/3.1 |
| 2009/0157707 | A1 | 6/2009 | Ito et al. |
| 2009/0310881 | A1 | 12/2009 | Kitagawa ....................... 382/266 |

(Continued)

FOREIGN PATENT DOCUMENTS

| | | |
|---|---|---|
| CN | 1307714 A | 8/2001 |
| CN | 1677430 A | 10/2005 |
| CN | 101610340 A | 12/2009 |
| JP | 61-020936 A | 1/1986 |
| JP | 2001-256491 A | 9/2001 |

*Primary Examiner* — Charlotte M Baker
*Assistant Examiner* — Rury Grisham
(74) *Attorney, Agent, or Firm* — Fitzpatrick, Cella, Harper & Scinto

(57) ABSTRACT

A signal value representing at least one of a plurality of types of optical characteristics are calculated for each pixel from the read signal obtained and output by reading light reflected by a document placed on a document table and a document table cover while the document is covered with the cover. It is determined, based on the signal value calculated, whether or not a target pixel is a pixel in a document region. A document region is detected from the determination result.

13 Claims, 16 Drawing Sheets

(56) References Cited

U.S. PATENT DOCUMENTS

| | | |
|---|---|---|
| 2010/0180189 A1 | 7/2010 | Ito et al. |
| 2010/0209010 A1 | 8/2010 | Kato et al. |
| 2011/0058741 A1 | 3/2011 | Ito et al. |
| 2011/0091113 A1 | 4/2011 | Ito et al. |
| 2011/0091115 A1 | 4/2011 | Kato et al. |
| 2011/0150341 A1 | 6/2011 | Yamamoto et al. |
| 2011/0158542 A1 | 6/2011 | Kato et al. |

\* cited by examiner $$\begin{pmatrix} sR \\ sG \\ sB \end{pmatrix} = \begin{pmatrix} a_{00} & a_{01} & a_{02} \\ a_{10} & a_{11} & a_{12} \\ a_{20} & a_{21} & a_{22} \end{pmatrix} \begin{pmatrix} dR \\ dG \\ dB \end{pmatrix}$$

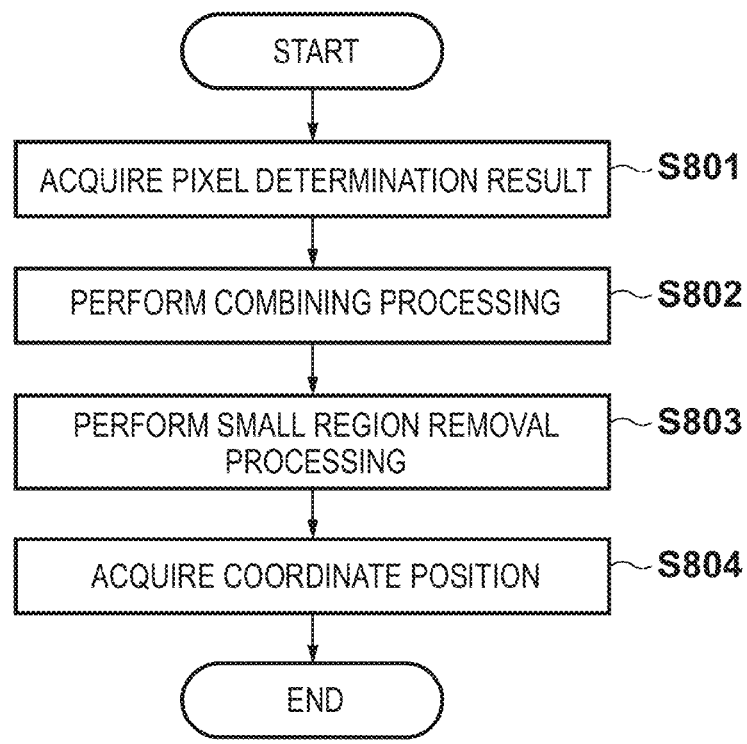

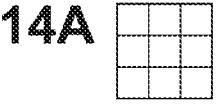
FIG. 14A
FIG. 14B
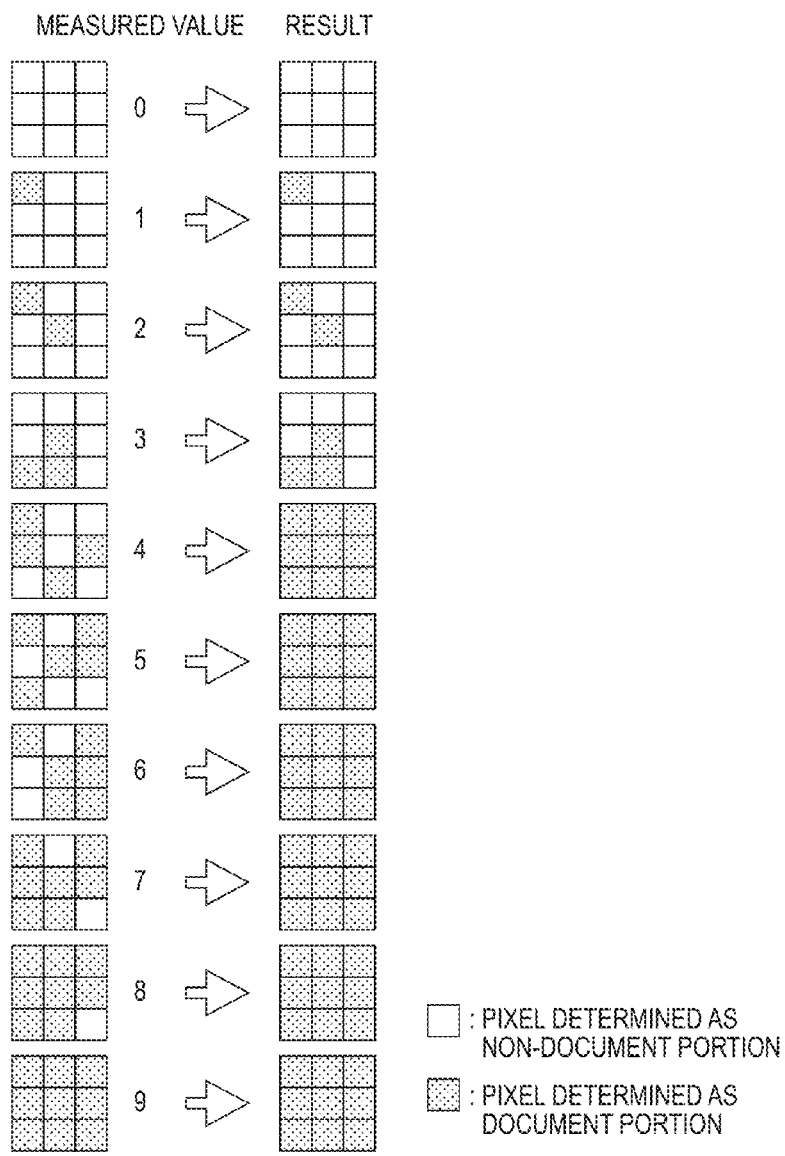

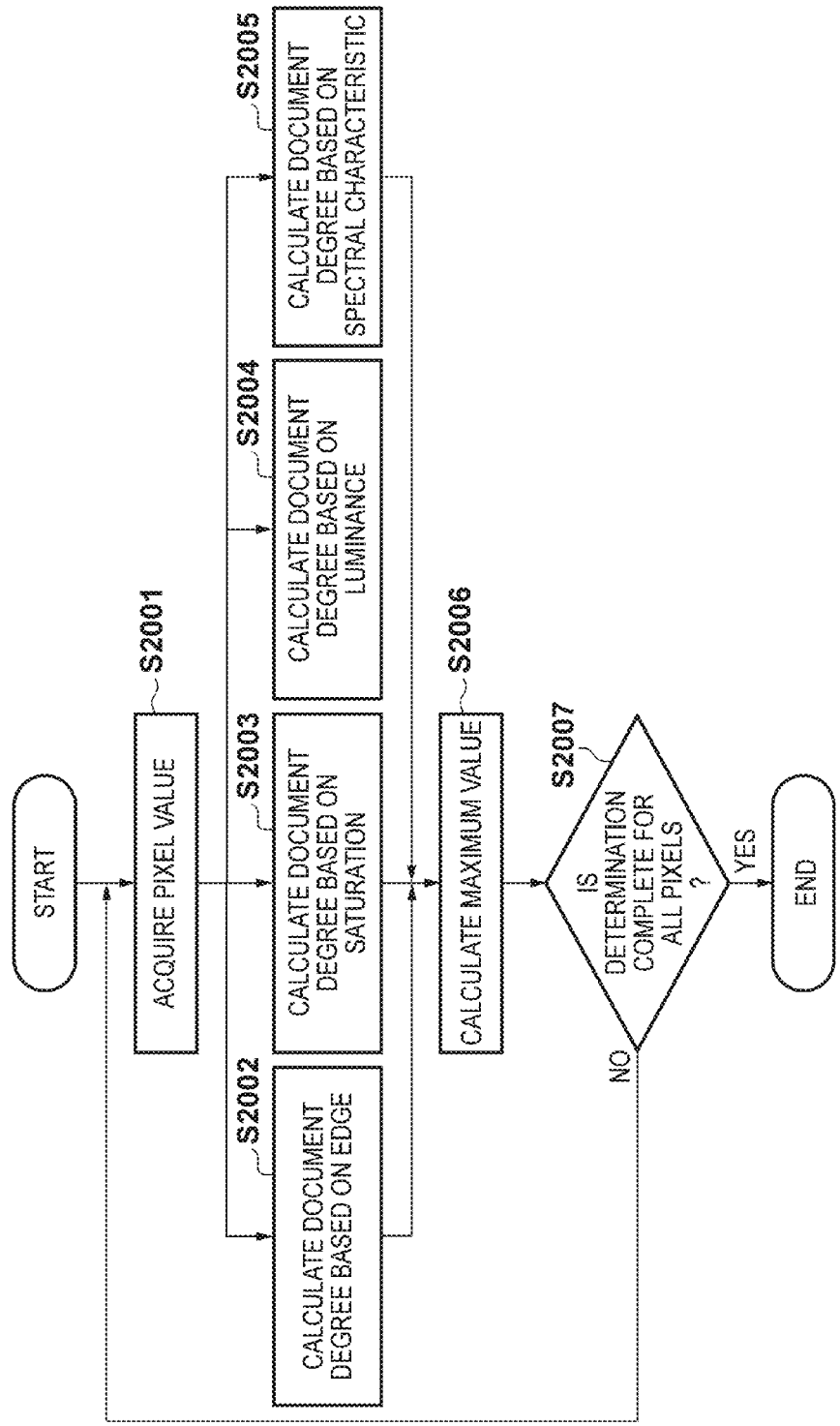

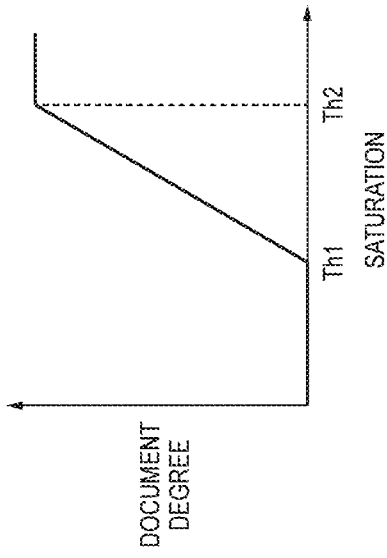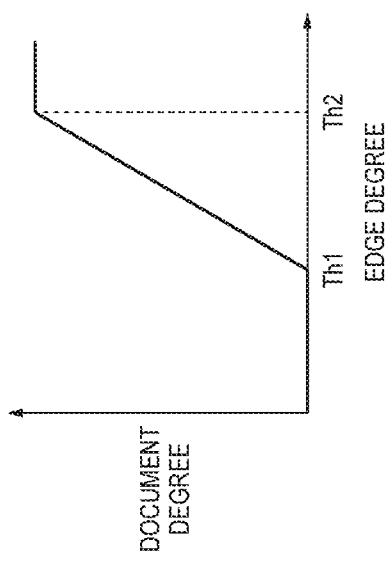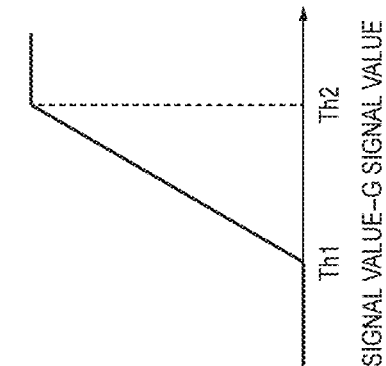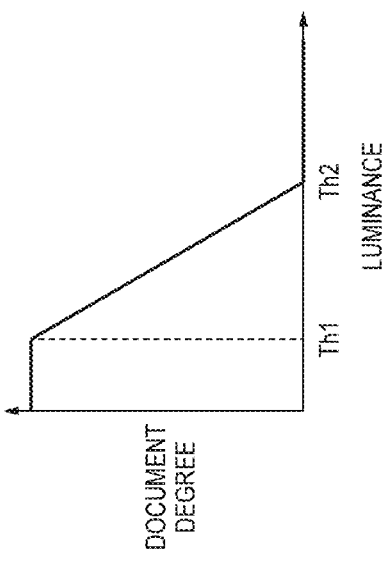

IMAGE PROCESSING APPARATUS AND DETERMINATION METHOD

BACKGROUND OF THE INVENTION

1. Field of the Invention

The present invention relates to an image processing apparatus which detects a document region and a determination method.

2. Description of the Related Art

Image reading apparatuses designed to optically read documents and photographs and convert the read data into electronic data are widely known. Recently, in general, such apparatuses have been used as multifunctional apparatuses having multiple functions such as a printing function, data transmission/reception function, copying function, and facsimile function as well as being used in a single standalone form. The hardware resource environment including CPUs, memories, and liquid crystal screens, which execute these processes, has remarkably advanced and greatly improved in performance. It is regarded important to provide more comfortable use environments to users by making the most use of these hardware resources. For example, it is important to provide an environment that implements high-level image processing without requiring any complicated operation for even a user who has no advanced knowledge.

Such image processing includes, for example, document region detection processing of detecting a document region from a reading result. Japanese Patent Laid-Open No. 61-20936 discloses a technique of estimating a paper size such as A4 or B5 based on the detection results obtained by a plurality of sensors provided under a glass document table. In addition, Japanese Patent Laid-Open No. 2001-256491 discloses a technique of discriminating a background from a document region by holding the range of the colors of background portions in advance and determining whether a target portion is included in the range. Japanese Patent Laid-Open No. 2001-256491 further discloses a technique of estimating a size while performing edge detection.

As sheets of paper to be read by an image reading apparatus, so-called sheets of plain paper are often used. Plain paper ranges from recycled paper made by recycling used paper to high-quality paper and varies widely in paper color, whiteness degree, and thickness. Conventionally, many types of recycled paper are tinged with yellow as compared with high-quality paper. However, an increasing number of types of recycled paper have the same whiteness as that of high-quality paper. As a consequence, plain paper with a high whiteness degree has been generally used.

The technique disclosed in Japanese Patent Laid-Open No. 2001-256491 is designed to detect a document region based on the held color data of background colors. If, however, a background has a color close to that of a document region, it is very difficult to detect the document region. If, for example, a reading target is a photographic document, since photographic data is printed on almost the entire region of a surface of the document sheet, any problems hardly occur in detection of a document region.

If, however, a reading target is a text document mainly including characters, non-printed regions on a surface of the document sheet are predominantly larger in number than printed regions. In addition, a white sheet is often used on a surface of the document table cover of an image reading apparatus which comes into contact with the document table. Such a white sheet is used to eliminate the necessity to use any extra ink or toner when processing a region corresponding to a marginal portion other than a document region in processing that includes printing processing such as copying operation and facsimile operation.

That is, it is difficult to accurately detect a document region by using the technique disclosed in Japanese Patent Laid-Open No. 2001-256491 in consideration of (a) plain paper improved in the degree of whiteness with high use frequency, (b) reading of a text document mostly occupied by non-printed regions, and (c) a white sheet used on a surface of a document table cover which comes into contact with a document table. As a result, part of a document region may not be detected or one document may be detected upon being segmented into a plurality of regions.

The detection method using the sensors disclosed in Japanese Patent Laid-Open No. 61-20936 can detect a document region regardless of the type and color of a document. However, this method is designed to perform detection at fixed positions, and hence to detect only documents with standardized sizes as reading targets. When detecting a document region, the user needs to place a document at corners of the document table or at a predetermined abutment portion. In addition, according to the detection method using the sensors disclosed in Japanese Patent Laid-Open No. 61-20936, when the user places a plurality of documents with small sizes such as name cards, the sizes may be erroneously detected. Furthermore, the cost of the apparatus increases by the number of sensors mounted in the apparatus.

SUMMARY OF THE INVENTION

An aspect of the present invention is to eliminate the above-mentioned problems with the conventional technology. The present invention provides an image processing apparatus which detects a document region with high accuracy and a determination method.

The present invention in its first aspect provides an image processing apparatus comprising: an obtaining unit configured to obtain image data which has first data corresponding to a document placed on a document table and second data corresponding to a cover over a document table; a calculation unit configured to calculate a signal value representing at least one of a plurality of types of optical characteristics for each pixel of the image data; and a determination unit configured to determine, based on the signal value calculated by the calculation unit, whether or not a target pixel is included in the document placed on the document table.

The present invention in its second aspect provides a determination method comprising: a reading step of reading a document table region on which a document is placed, by using a reading unit which outputs reading signal while the document is covered with a cover on the document table; a generating step of generating image data based on the reading signal; a calculation step of calculating a signal value representing at least one of a plurality of types of optical characteristics for each pixel from the image data; and a determination step of determining, based on the signal value calculated in the calculation step, whether or not a target pixel is included in a document region placed on the document table.

According to the present invention, it is possible to detect a document region with high accuracy.

Further features of the present invention will become apparent from the following description of exemplary embodiments with reference to the attached drawings.

BRIEF DESCRIPTION OF THE DRAWINGS

FIG. 8 is a flowchart showing a procedure for document region specifying processing;

FIG. 9 is a view showing an example of an edge extraction filter;

FIGS. 14A and 14B are views showing an example of combining processing;

FIG. 20 is a flowchart showing a procedure for pixel determination processing in the third embodiment; and FIGS. 21A to 21D are graphs for explaining determination of a document degree.

DESCRIPTION OF THE EMBODIMENTS

Figure 1:
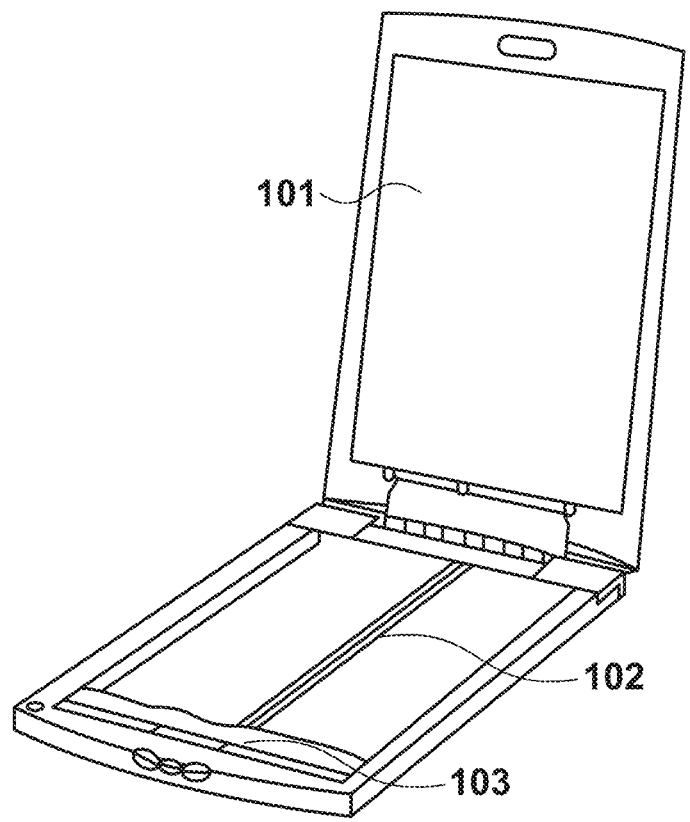
FIG. 1 is a perspective view showing an outline of an image reading apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description of them will be omitted.

First Embodiment

Arrangement of Image Reading Apparatus

FIG. 1 is a perspective view showing an outline of an image reading apparatus according to an embodiment of the present invention. An image reading apparatus 100 includes a document table cover 101 which holds a set document so as to cover it, a document table (platen) 102 on which a document is to be placed, and a document reading unit 103 for reading a set document. When the user places a document on the document table 102, the image reading apparatus 100 drives the document reading unit 103 by using a motor (not shown) to optically read the document by using a light source installed in the document reading unit 103 and sensors (not shown) which detect reflection signals.

Figure 2:
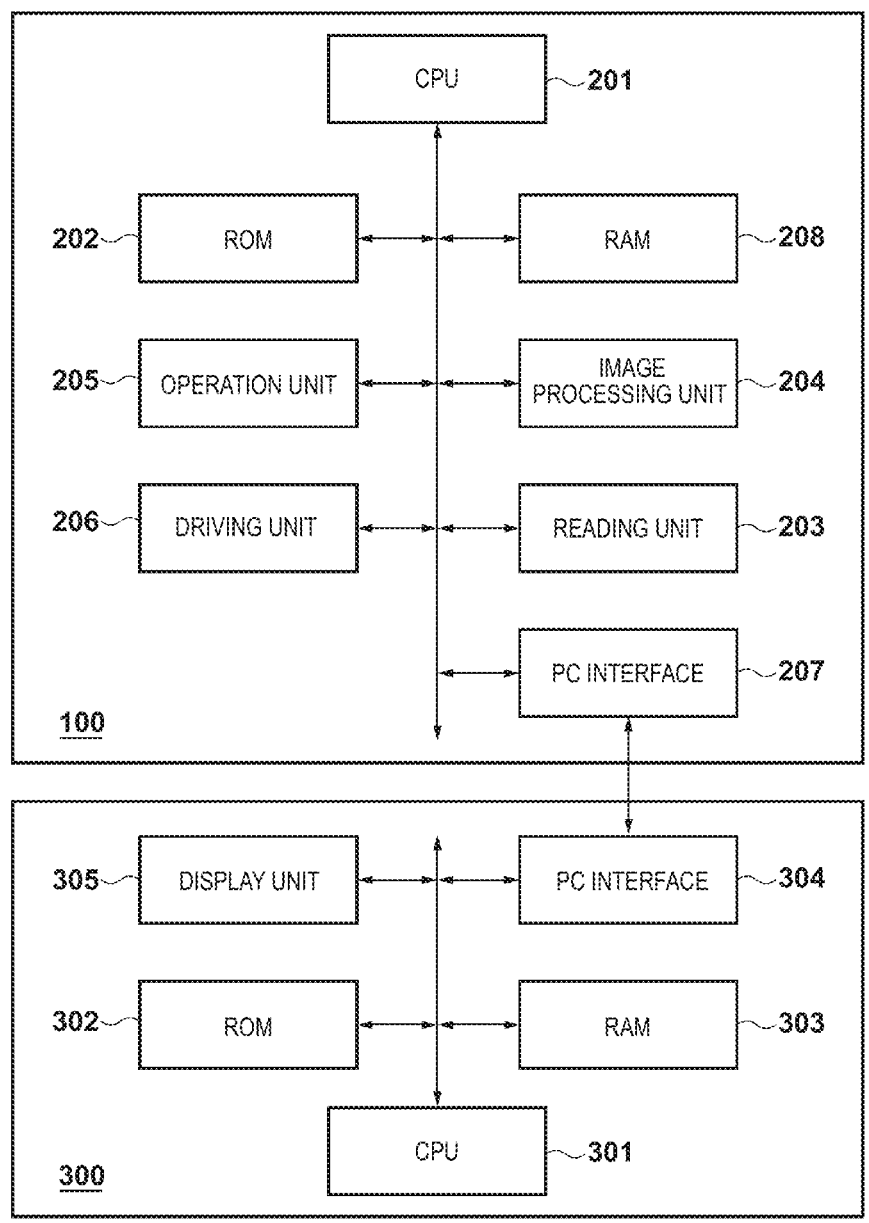
FIG. 2 is a block diagram showing the internal arrangement of the image reading apparatus and the internal arrangement of the host apparatus.

FIG. 2 is a block diagram showing the internal arrangement of the image reading apparatus 100 and the internal arrangement of the host apparatus (for example, a PC) 300. Referring to FIG. 2, a CPU 201 controls the overall image reading apparatus 100 and executes programs stored in a ROM 202. The ROM 202 stores various data used for image processing such as shading. A reading unit 203 reads a document image and outputs analog luminance data (read signal) of red (R), green (G), and blue (B). An image processing unit 204 performs image processing such as correcting the read signal value obtained by converting analog luminance data into digital data by A/D conversion or encoding the data. When it is necessary to store data in image processing, a RAM 208 is temporarily used. Referring to FIG. 2, a CPU 301 controls the overall PC 300 and executes programs stored in a ROM 302. The ROM 302 stores various data used for image processing. RAM 303 stores data, for example, generated upon performing image processing.

An operation unit 205 includes a reading key. Upon detecting that the key is pressed by the user, the CPU 201 performs image reading operation by controlling the respective units. A driving unit 206 includes a driver circuit for controlling the motor for the reading unit 203. A PC interface 207 is an interface with a PC 300. The image reading apparatus 100 transfers data to the PC 300 via the PC interface 207 and a PC interface 304. When a buffer is required in data transfer, the RAM 208 is used.

Figure 3:
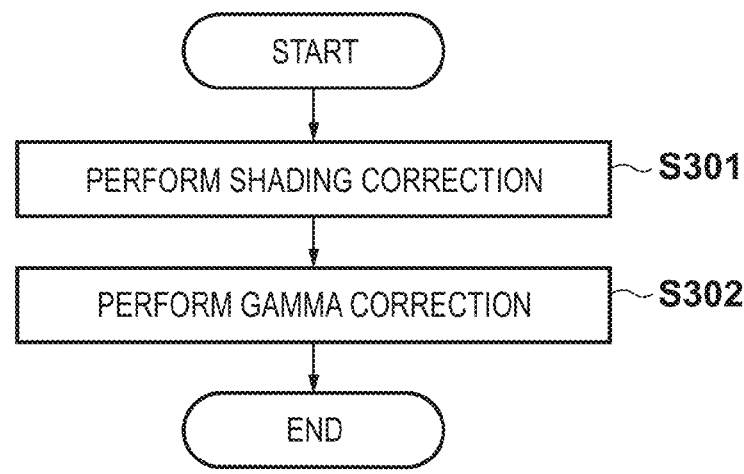
FIG. 3 is a flowchart showing a procedure for image processing.

FIG. 3 is a flowchart showing a procedure for image processing executed by the image processing unit 204. First of all, in step S301, the image processing unit 204 performs shading correction for the image data read by the reading unit 203 and A/D-converted. The image processing unit 204 performs shading correction by reading a white sheet prepared in advance as a white reference and a black sheet as a black reference, and correcting variations between image sensing elements based on a read signal value for each image sensing element. In step S302, the image processing unit 204 performs gamma correction. The image processing unit 204 executes gamma correction by referring to a table held in the ROM 202 in advance. After step S302, the image processing unit 204 transfers the read image data to the PC 300 via the PC interface 207. In this case, it is possible to reduce the transfer data amount by compressing the image data before the transfer of the image data. It is also possible to switch between compressing data and not compressing the data in accordance with the transfer speed with respect to the PC 300.

Figure 4:
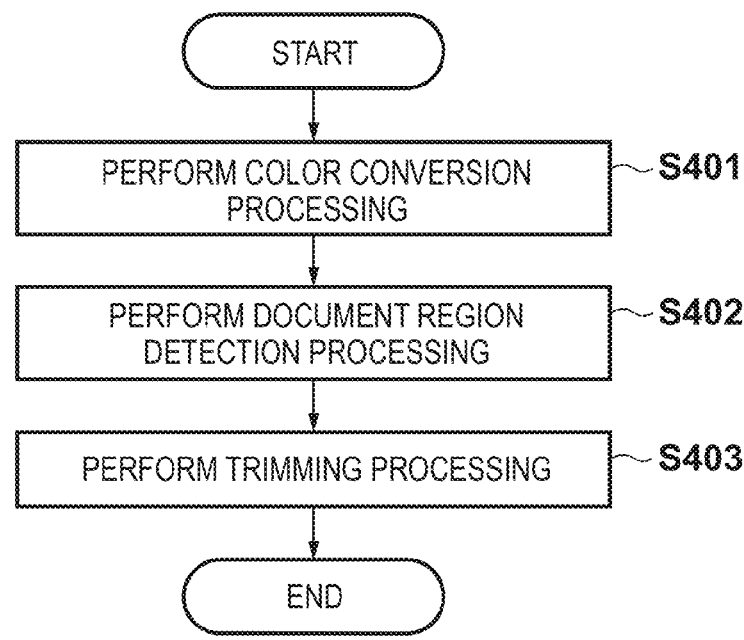
FIG. 4 is a flowchart showing a procedure including document region detection processing.

FIG. 4 is a flowchart showing a procedure for image processing after data transfer to the PC 300. For example, the CPU 301 of the PC 300 executes the processing shown in FIG. 4. In step S401, the CPU 301 executes color conversion processing for the image data transferred to the PC 300. The CPU performs color conversion processing to convert the read signal values unique to the image reading apparatus 100 into values in a general color space. For example, the CPU converts dR, dG, and dB, which represent three channels of colors, into sR, sG, and sB, which represent a general color space. In this case, a general color space is a color space in which colors are defined, and includes the sRGB space as a standard color space for monitor display. Several methods are known as color space mapping methods. For example, the CPU may execute mapping by matrix calculation like that shown in FIG. 5. The CPU calculates sR, sG, and sB based on a predetermined 3 row×3 column matrix with a00 to a22 like that shown in FIG. 5. Obviously, it is possible to increase the accuracy of color conversion by, for example, a method of increasing the order of the matrix or preparing the values of discrete points after conversion in the form of a lookup table and calculating intermediate values by interpolation processing. In step S402, the CPU 301 of the PC 300 executes detection processing of a document region for the image data having undergone color conversion processing. The details of detection processing of a document region will be described later. In step S403, the CPU 301 of the PC 300 performs trimming processing of the image data based on the document region detected in step S402. Executing image processing like that shown in FIG. 4 can extract only a region corresponding to the document placed on the document table 102 of the image reading apparatus 100 from the entire region on the document table 102. It is then possible to transmit data corresponding to the extracted document region to the display unit 305 and display the data on the display unit 305 or to transmit the data to a printing apparatus and perform printing control. In the processing shown in FIG. 4, when the image reading apparatus 100 transfers compressed data, the data may be decoded before step S401. In addition, although different apparatuses execute the respective processes shown in FIGS. 3 and 4, an integral type image reading apparatus may execute them.

Figures 5, 6:
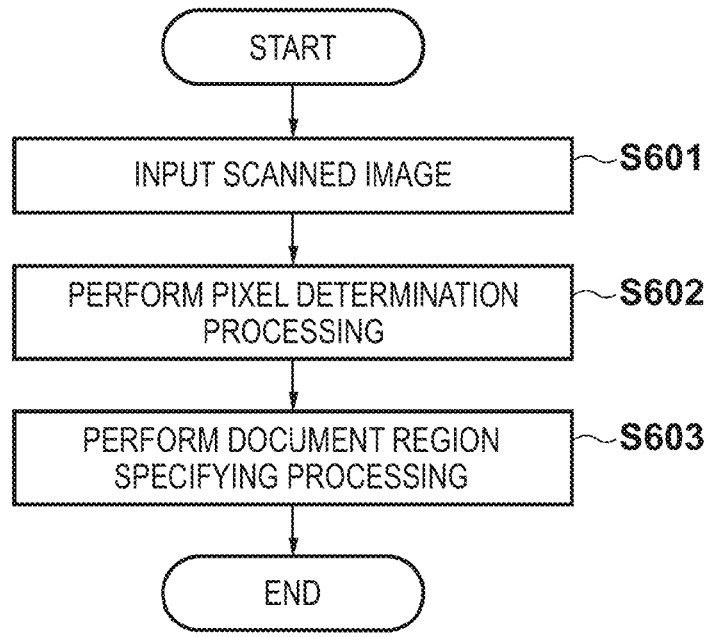
FIG. 5 is a view showing an example of an equation for color space conversion.
FIG. 6 is a flowchart showing a procedure for document region detection processing.

FIG. 6 is a flowchart showing a procedure for document region detection processing in step S402. In step S601, the CPU 301 of the PC 300 receives the image data having undergone color conversion processing in step S401. In step S602, the CPU 301 executes document determination processing for the input image data for each pixel. In step S603, the CPU 301 specifies a document region based on the determination result obtained for each pixel in step S602. Although a description about specifying of a document region will be made later, a region constituted by a set of a predetermined number or more of pixels determined as pixels in a document region is detected as a document region. The document determination processing in step S602 and the document region specifying processing in step S603 will be described below.

[Document Portion Determination Processing]

Figure 7:
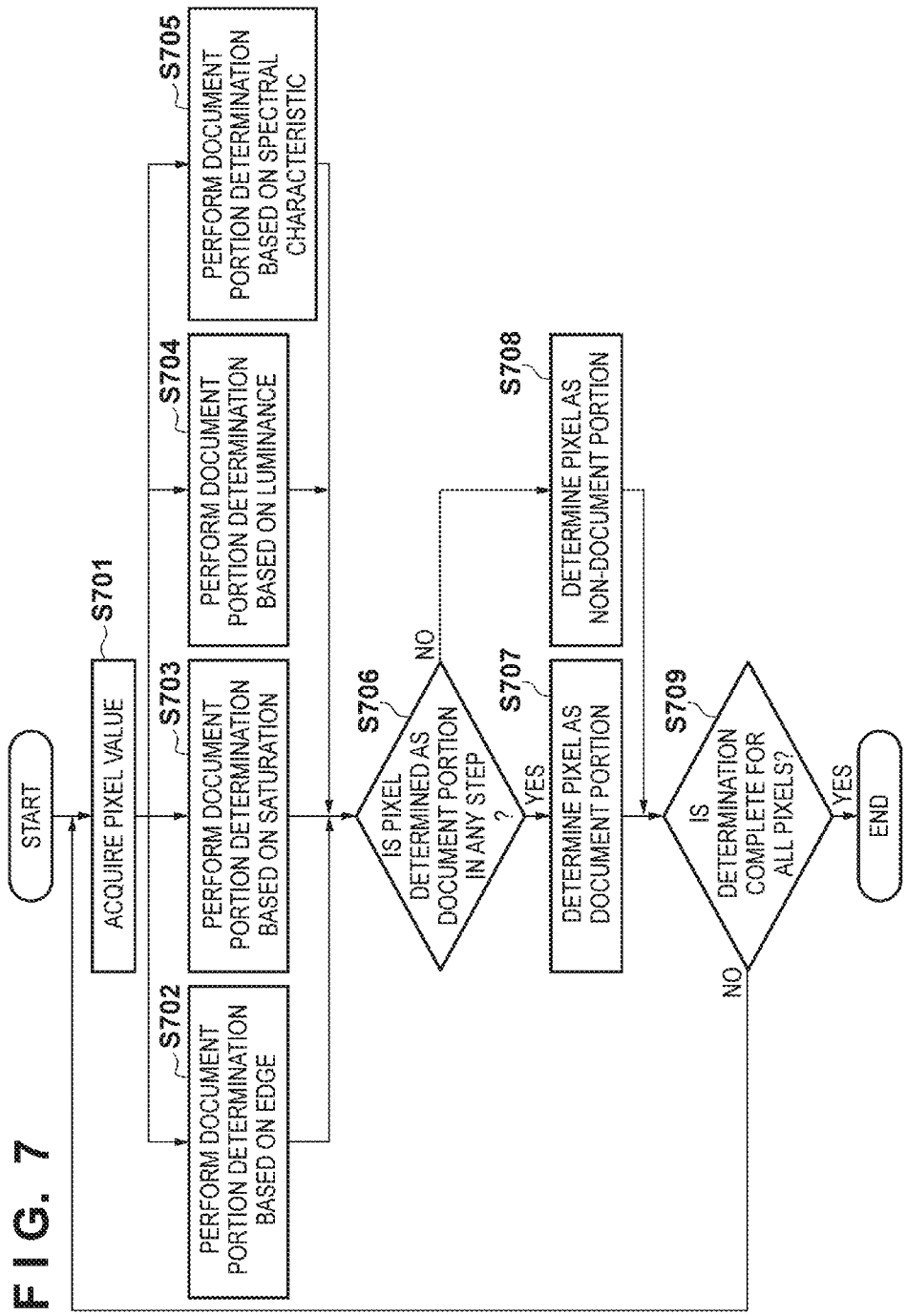
FIG. 7 is a flowchart showing a procedure for pixel determination processing in the first embodiment.

FIG. 7 is a flowchart showing a procedure for pixel determination processing. In step S701, the CPU 301 acquires a pixel value as a determination target. In this embodiment, the CPU 301 sometimes refers to not only a pixel as a determination target but also the pixel values of pixels around the determination target, and hence obtains not only the pixel value as the determination target but also the pixel values of the pixels around the determination target. The CPU 301 then executes document determination processing in steps S702, S703, S704, and S705 by using signal values representing a plurality of types of optical characteristics including edge, saturation, luminance, and spectral characteristic.

[Edge Determination Processing]

First of all, in step S702, the CPU 301 executes edge determination processing. Edge determination processing is the processing for detecting the boundary between an end portion of a document and the white sheet portion (to be referred to as a white pressure plate hereinafter) of the document table cover 101 which becomes a background. In edge determination processing, the CPU refers to the pixel values of surrounding pixels to determine whether a target pixel is an edge portion.

FIG. 9 is a view showing a Laplacian filter as an example of an edge extraction filter used in step S702. A pixel 901 in FIG. 9 is a determination target pixel. The CPU 301 performs filter processing for each of the eight pixels around the pixel 901 in accordance with the coefficient written for each pixel. In this case, filter processing is product-sum operation using pixel values and coefficients. Filter processing can acquire image data in which only an edge portion is enhanced. Note that filter processing may be applied to each of R, G, and B signal values of the acquired pixel values. The CPU 301 may convert the R, G, and B signals into luminance signals according to equation (1) and execute filter processing based on the luminance signals.

$$\text{luminance } Y=(0.30\times R)+(0.59\times G)+(0.11\times B) \tag{1}$$

The CPU 301 binarizes the data having undergone filter processing by comparing the data with a predetermined threshold and then performs edge determination processing. That is, the CPU 301 sorts the target data having undergone filter processing into data equal to or more than a threshold and data less than the threshold by comparing the data with the threshold. In this case, if given data is equal to or more than the threshold, the CPU 301 determines that the target pixel is an edge portion. If given data is less than the threshold, the CPU 301 determines that the target pixel is a non-edge portion. If each of R, G, and B signal values has undergone filter processing, the CPU 301 binarizes each of the R, G, and B signals. In this case, if one of the R, G, and B signals is determined as a signal representing an edge portion, the CPU 301 determines that the target pixel is an edge pixel. Note that a threshold is decided in consideration of, for example, the degree of recognition of an end portion of a document as an edge upon a single white pressure plate being binarized.

[Saturation Determination Processing]

Pixel determination processing based on saturation in step S703 will be described next. In this processing, the CPU 301 determines, based on the saturation of a determination target pixel, whether the pixel is a document portion. Since this processing is the pixel determination processing based on the saturation of a determination target pixel, it is not necessary to refer to the pixel values of surrounding pixels as in the processing in step S702. First of all, the CPU 301 converts an acquired RGB signal value into color differences Cb and Cr according to equations (2) and (3) given below.

$$\text{color difference } Cb=(-0.17\times R)-(0.33\times G)+(0.50\times B) \tag{2}$$

$$\text{color difference } Cr=(0.50\times R)-(0.42\times G)-(0.08\times B) \tag{3}$$

The CPU 301 then calculates a saturation S from the converted color differences Cb and Cr according to equation (4).

$$\text{saturation } S((Cb\times Cb)+(Cr\times Cr))^{1/2} \tag{4}$$

The CPU 301 then binarizes the calculated saturation S with a predetermined threshold and performs pixel determination processing based on the saturation. Pixel determination method after binarization is the same as that described in association with step S702. Note that a threshold is decided in consideration of, for example, the saturation of a single white pressure plate and the saturation of a document.

[Luminance Determination Processing]

Pixel determination processing based on luminance in step S704 will be described next. In this processing, the CPU 301 determines, based the luminance of a determination target pixel, whether the pixel is a document portion. This processing is pixel determination processing based on the luminance of a determination target pixel, and hence it is not necessary to refer to the pixel values of surrounding pixels as in the determination processing in step S702. First of all, the CPU 301 converts an acquired RGB signal value into the luminance Y according to equation (1). The CPU 301 then binarizes the calculated luminance Y with a predetermined threshold and performs pixel determination processing based on the luminance. Pixel determination method after binarization is the same as that described in association with step S702. Note that a threshold is decided in consideration of, for example, the luminance of a white pressure plate alone and the luminance of a document.

[Spectral Characteristic Determination Processing]

Pixel determination processing based on spectral characteristics in step S705 will be described next. In this processing, the CPU 301 determines by using the spectral characteristic of a determination target pixel, whether the pixel is a document portion. The main purpose of this processing is to separate a sheet (plain paper) from a white pressure plate.

Figure 10:
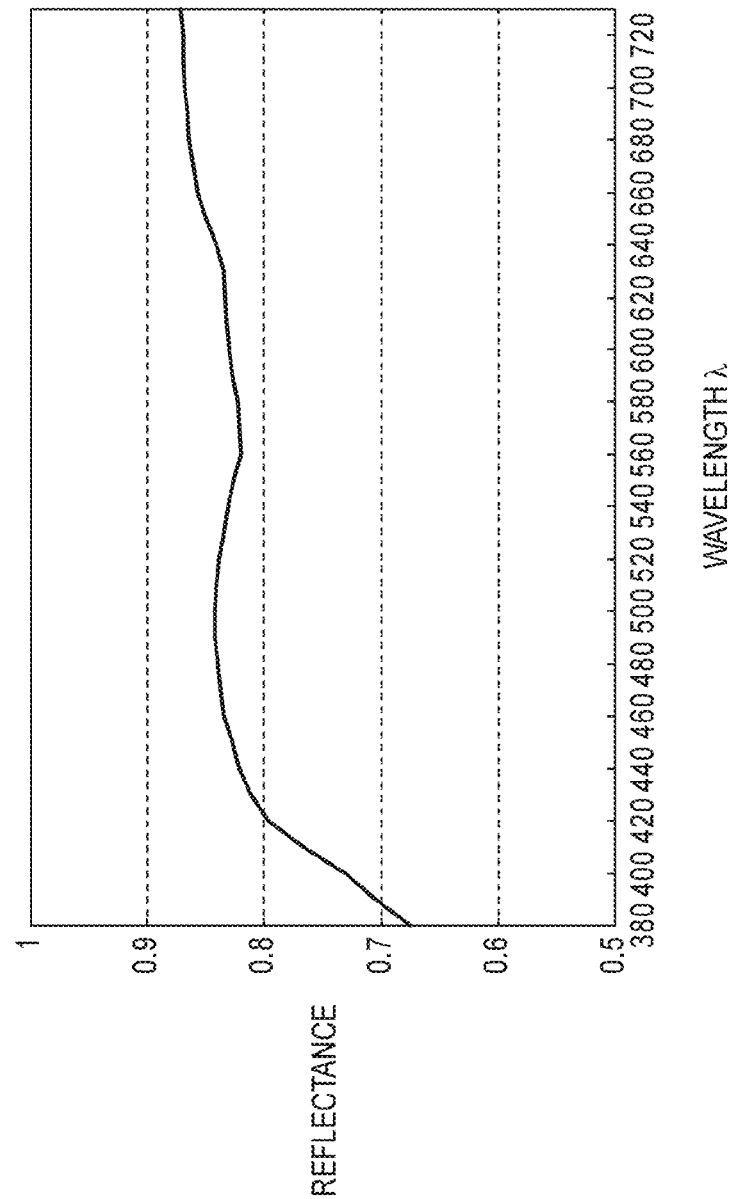
FIG. 10 is a graph showing the measured values of the spectral characteristic of non-recycled plain paper.

The spectral characteristic of plain paper will be described below. FIG. 10 is a graph showing the measured values of the spectral characteristic of plain paper manufactured through a general manufacturing process without recycling. Plain paper is manufactured from pulp. Plain paper in a pulp state is tinged with a cream color. Subsequent bleaching and bluing processes will adjust the color of paper.

With regard to spectral characteristics, in a pulp state, the reflectance of a short-wavelength portion is low. In a bleaching process, such characteristics change to flat, uniform characteristics. In a bluing process, the reflectances of the short- and long-wavelength portions slightly increase. That is, the spectral characteristics become those shown in FIG. 10. From the viewpoint of spectral characteristics, therefore, the reflectance characteristics of plain paper change such that the reflectance sequentially changes to high, low, and high levels from the short-wavelength portion. When rephrased with colors, blue, green, and red components tend to have high reflectance, low reflectance, and high reflectance, respectively.

Figure 11:
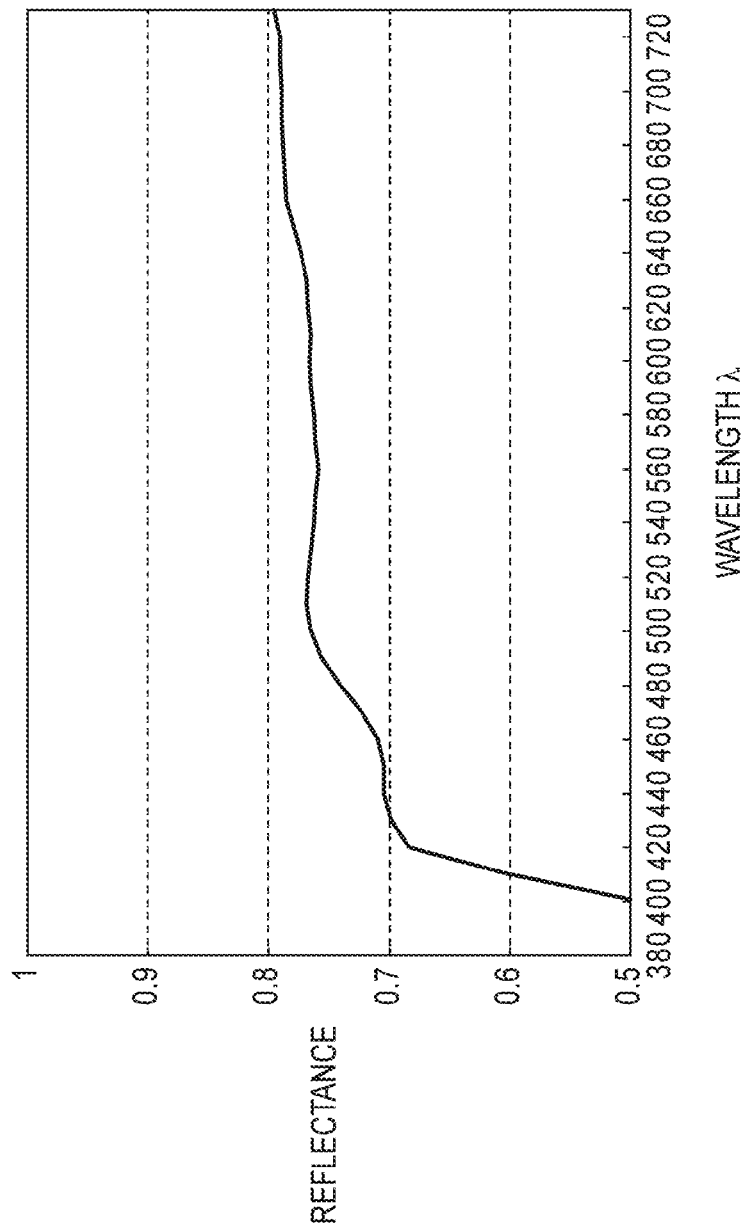
FIG. 11 is a graph showing the measured values of the spectral characteristic of recycled plain paper.

FIG. 11 is a graph showing the measured values of the spectral characteristic of recycled plain paper (recycled sheet). A recycled sheet is slightly tinged with yellow as compared with the above plain paper, and hence the overall reflectance is lower than that of the plain paper in FIG. 10, and the reflectance on the short-wavelength side is slightly low. For this reason, the reflectance sequentially changes to low, intermediate, and high levels. When rephrased with colors, blue, green, and red components tend to have low reflectance, intermediate reflectance, and high reflectance, respectively.

Figure 12:
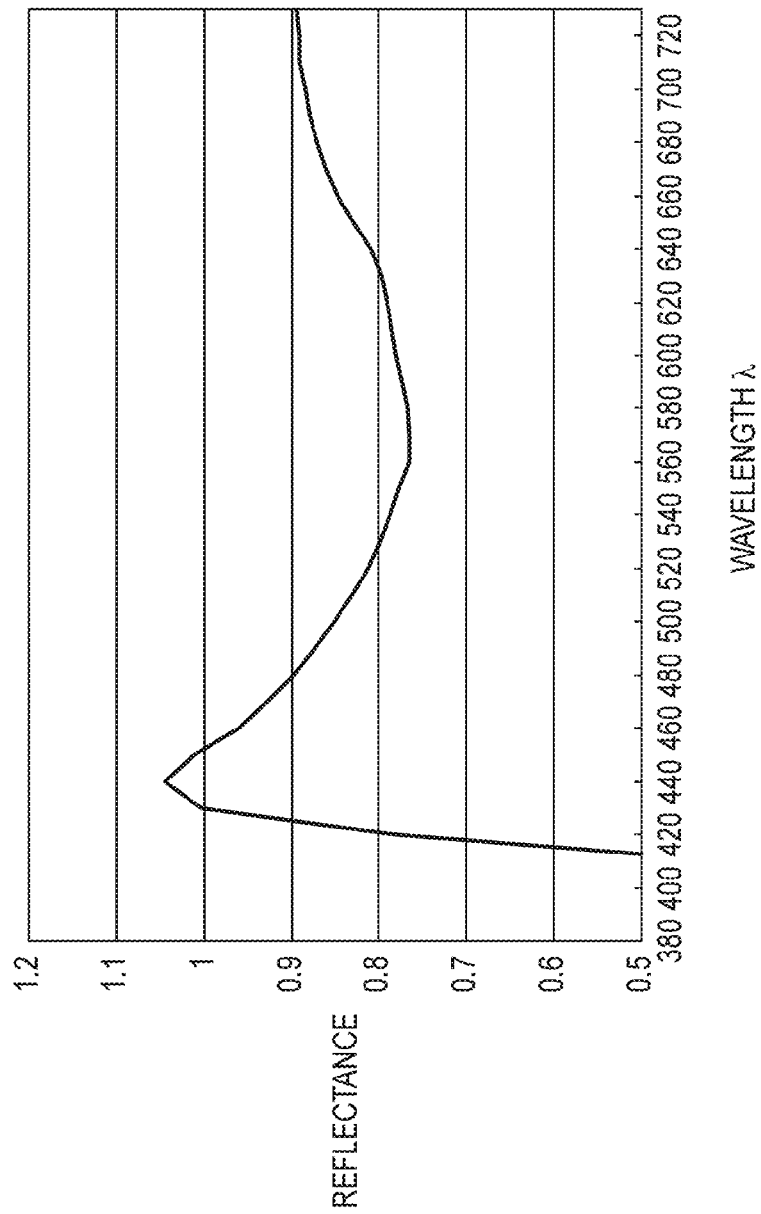
FIG. 12 is a graph showing the measured values of the spectral characteristic of recycled plain doped with a paper fluorescent brightening agent.

FIG. 12 is a graph showing the measured values of the spectral characteristic of plain doped with a paper fluorescent brightening agent. Recently, plain paper added with a paper fluorescent brightening agent has generally been distributed to the market. As shown in FIG. 12, the spectral characteristic of this plain paper sequentially changes to high, low, and intermediate levels from the short-wavelength side due to the influence of the paper fluorescent brightening agent. When rephrased with colors, blue, green, and red components tend to have very high reflectance, low reflectance, and high reflectance, respectively.

Figure 13:
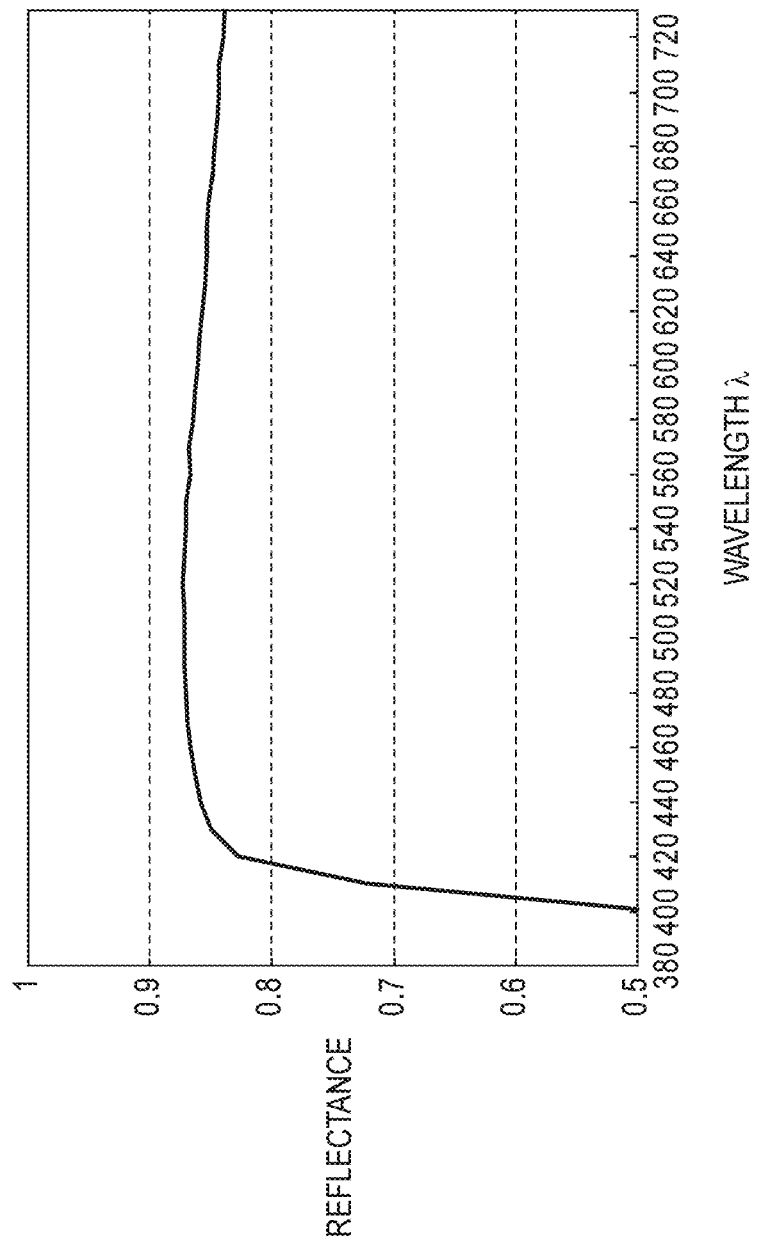
FIG. 13 is a graph showing the measured values of the spectral characteristic of a white pressure plate.

As shown in FIGS. 10 to 12, when taking the reflectances of green and red components into consideration, it is obvious that the reflectance of a red component is always higher. On the other hand, FIG. 13 is a graph showing the measured values of the spectral characteristic of a white pressure plate. The white pressure plate is often made of a synthetic resin in consideration of strength and durability. The white pressure plate used for the measurement of spectral characteristics is also manufactured from polypropylene. As shown in FIG. 13, this plate exhibits flat spectral characteristics except for a short-wavelength portion. That is, it is obvious that the plate does not tend to increase in reflectance with respect to red like plain paper.

In consideration of the spectral characteristics shown in FIGS. 10 to 13, the G signal value and R signal value of the pixel value of a determination target pixel are focused in step S705. If the R signal value is larger than the G signal value, the pixel is determined as a plain paper portion, that is, a document portion. If the R signal value is larger than the G signal value, the CPU 301 determines that a document has been read. On the other hand, if the R signal value is not larger than the G signal value, the pixel is determined as a white pressure plate portion instead of a document portion. In this case, the CPU 301 may determine that a portion, of the contents printed on a document, in which the R signal tends not to be larger than the G signal, for example, a portion printed in red, is a non-document portion. This embodiment, however, aims at a text document having nothing printed on its most region, and hence it is sufficiently possible to cut out a document region by the processing in step S705. In this manner, the CPU 301 determines, based on G and R signal values, whether a document has been read. Alternatively, the CPU 301 determines, based on G and R signal values, whether a document or the pressure plate has been read.

Upon determining in step S706 that the pixel is determined as a document portion in any one of the processes in steps S702 to S705, the CPU 301 determines in step S707 that the pixel is a document portion. Upon determining that the pixel is a non-document portion in all the processes in steps S702 to S705, the CPU 301 determines in step S708 that the pixel is a non-document portion. In step S709, the CPU 301 determines whether pixel determination has been complete for all the pixels. Upon determining that pixel determination processing has not been complete for all the pixels, the CPU 301 performs processing from step S701 for the next pixel value as a target pixel. Upon determining that pixel determination processing has been complete for all the pixels, the CPU 301 terminates the processing shown in FIG. 7.

[Document Region Specifying Processing]

Document region specifying processing in step S603 will be described next. FIG. 8 is a flowchart showing a procedure for document region specifying processing. In step S801, the CPU 301 acquires the determination result on each pixel which is obtained in step S602. In step S802, the CPU 301 performs combining processing for the determination result on each pixel in a predetermined region.

An example of combining processing will be described with reference to FIGS. 14A and 14B. As shown in FIG. 14A, the CPU 301 counts pixels, of 3×3=9 pixels, which are determined as document portions. If the number of pixels determined as document portions is equal to or more than a predetermined number, the CPU 301 determines that all the nine pixels are document portion, and performs painting processing. If the number of pixels determined as document portions is less than the predetermined number, the CPU does not perform painting processing. Assume that the predetermined number of four. In this case, as shown in FIG. 14B, if the number of pixels, of 3×3=9 pixels, which are determined as document portions is equal to or more than four, the CPU 301 paints all the pixels. The CPU 301 may change a determination criterion by making the unit number of pixels changeable. In addition, the CPU 301 may set 3×3=9 pixels as one block and further paints a plurality of blocks in the same manner. In this embodiment, combining processing in step S802 can combine determination results exhibiting variations for each pixel. Alternatively, the CPU 301 may absorb variations in determination result on each pixel by some other method.

In step S803, the CPU 301 removes pixel groups (small regions) determined as discrete document portions after the combining processing in step S802. Such discrete small regions can be a cause of a decrease in accuracy in cutting out a document region. In this case, it is possible to use various methods for removing small regions. For example, the CPU 301 sets a group of adjacent pixels determined as document portions as one unit, and measures the area (the number of pixels) of each group. If the area of the group is equal to or less than a predetermined value, the CPU 301 determines that the pixel group is a non-document portion, and removes it. Alternatively, the CPU 301 may determine discrete pixel groups other than a pixel group having the largest area as non-document portions and remove them.

Figure 15:
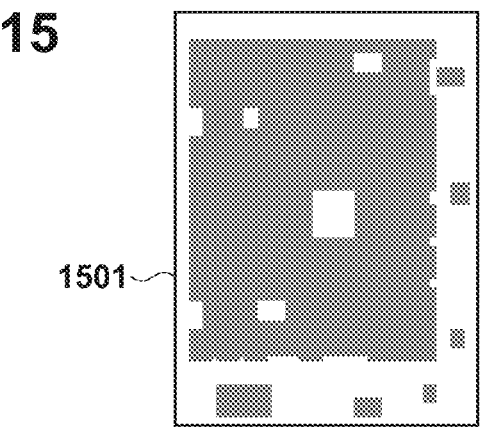
FIG. 15 is a view for explaining the removal of small regions.
Figure 16:
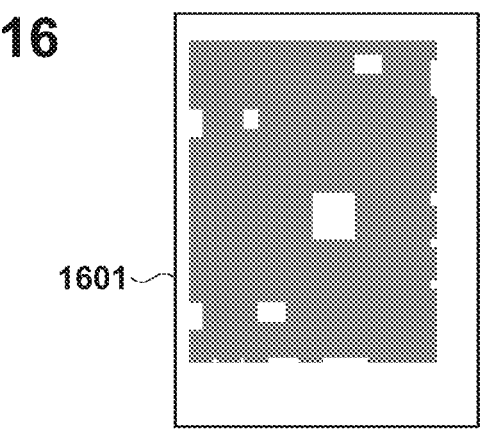
FIG. 16 is a view showing the result obtained by removing small regions.

FIG. 15 is a view for explaining the removal of small regions. The black regions in read image data 1501 shown in FIG. 15 represent groups of pixels determined as document portions. In addition, the white regions represent groups of pixels determined as non-document portions. As shown in FIG. 15, there are discrete small groups of pixels determined as document portions other than obviously the largest group of pixels determined as document portions. As described above, the CPU 301 determines that a small pixel group having an area equal to or less than a predetermined value as a non-document portion, and changes the determination result. FIG. 16 is a view showing the data having undergone the above processing. As shown in FIG. 16, the discrete small pixel groups in FIG. 15 are removed. This makes it possible to cut out only a document region with high accuracy.

Figure 17:
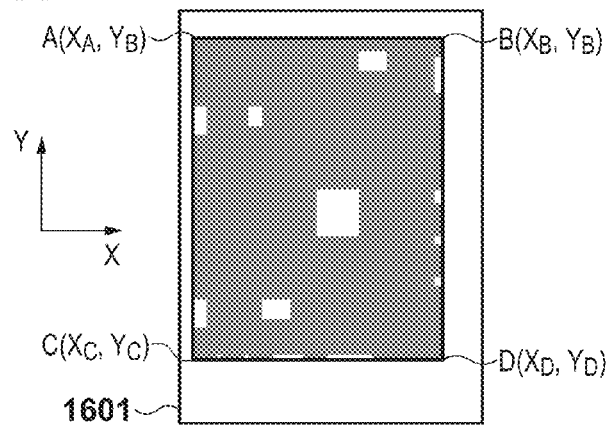
FIG. 17 is a view for explaining the calculation of the positions of the four corners of a document region.

In step S804, the CPU 301 specifies the coordinate positions of the cut document region. First of all, the CPU 301 calculates the positions of the four corners of the document region. Referring to FIG. 17, four points A, B, C, and D represent the four corners. If, for example, a plurality of regions (groups) exist (for example, a plurality of non-document portions exist in a region determined as a document portion) as the result of cutting out in step S803, the CPU 301 may calculate the coordinate values of the four points of the largest region of these regions. In this embodiment, the CPU 301 sets 3×3=9 pixels as a unit. It is also possible to cope with the tilt of a document by decreasing the unit and calculating the coordinates of a corner point of a region which is determined as a document portion and painted.

Second Embodiment

The first embodiment improves the accuracy of determination on whether each region is a document region by performing a plurality of pixel determination processes like those in steps S702 to S705 in FIG. 7. In contrast to this, the second embodiment allows to change the scalability of each pixel determination process in the first embodiment. Only points different from the first embodiment will be described below.

This embodiment gives consideration to a case in which the user selects a document type via a user interface window or a case in which an ADF (Auto Document Feeder) which automatically reads documents is used. That is, the embodiment gives consideration to a case in which it is obvious that plain paper documents will be used.

Figure 18:
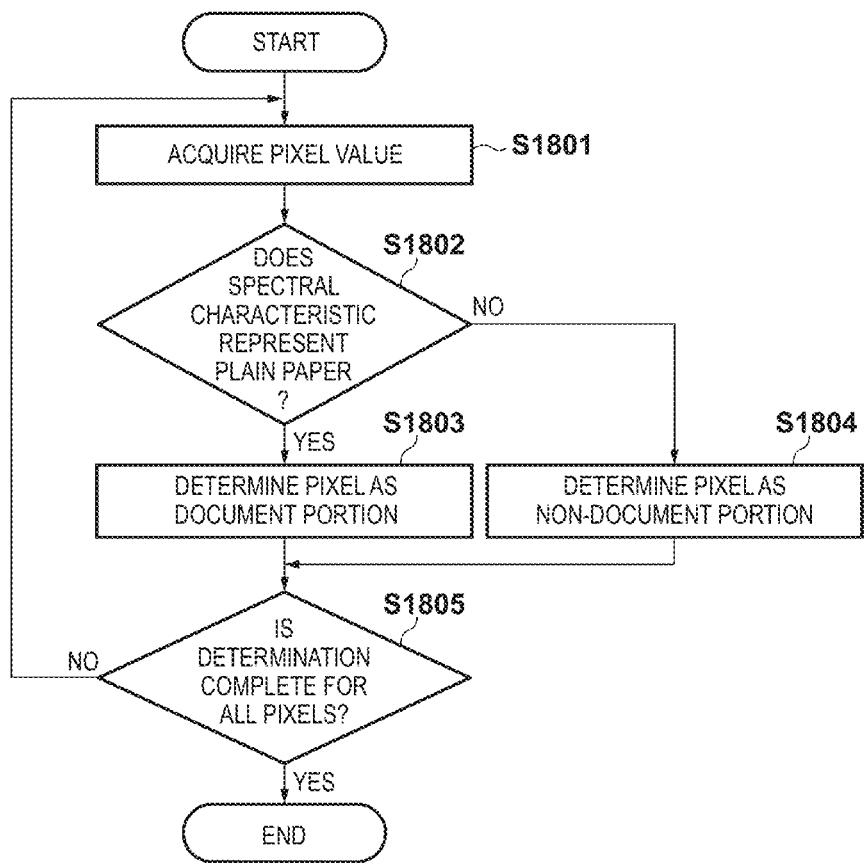
FIG. 18 is a flowchart showing a procedure for pixel determination processing in the second embodiment.

FIG. 18 is a flowchart showing a procedure for pixel determination processing in this embodiment. This processing corresponds to pixel determination processing in step S602 in FIG. 6. Step S1801 in FIG. 18 corresponds to step S701 in FIG. 7. Step S1803 in FIG. 18 corresponds to step S707 in FIG. 7. Step S1804 in FIG. 18 corresponds to step S708 in FIG. 7. Step S1805 in FIG. 18 corresponds to step S709 in FIG. 7.

In step S1802 in FIG. 18, the CPU 301 executes the processing in step S705 in FIG. 7. This embodiment is configured to determine, by using only the result in step S1802, whether a target pixel is a document portion. As described above, if it is obvious that plain paper documents will be used, it is sufficiently possible to determine, in accordance with the minimum condition shown in FIG. 18, whether a target pixel is a document portion. Although FIG. 18 shows an example of the minimum condition, the CPU 301 may perform pixel determination processing based on saturation concurrently with step S1802. This processing corresponds to the processing in FIG. 7 from which steps S702 and S704 are omitted. Performing pixel determination processing based on saturation and pixel determination processing based on spectral characteristics can cut out a color background document having a red background which is difficult to detect under the minimum condition concerning only spectral characteristics.

Figure 19:
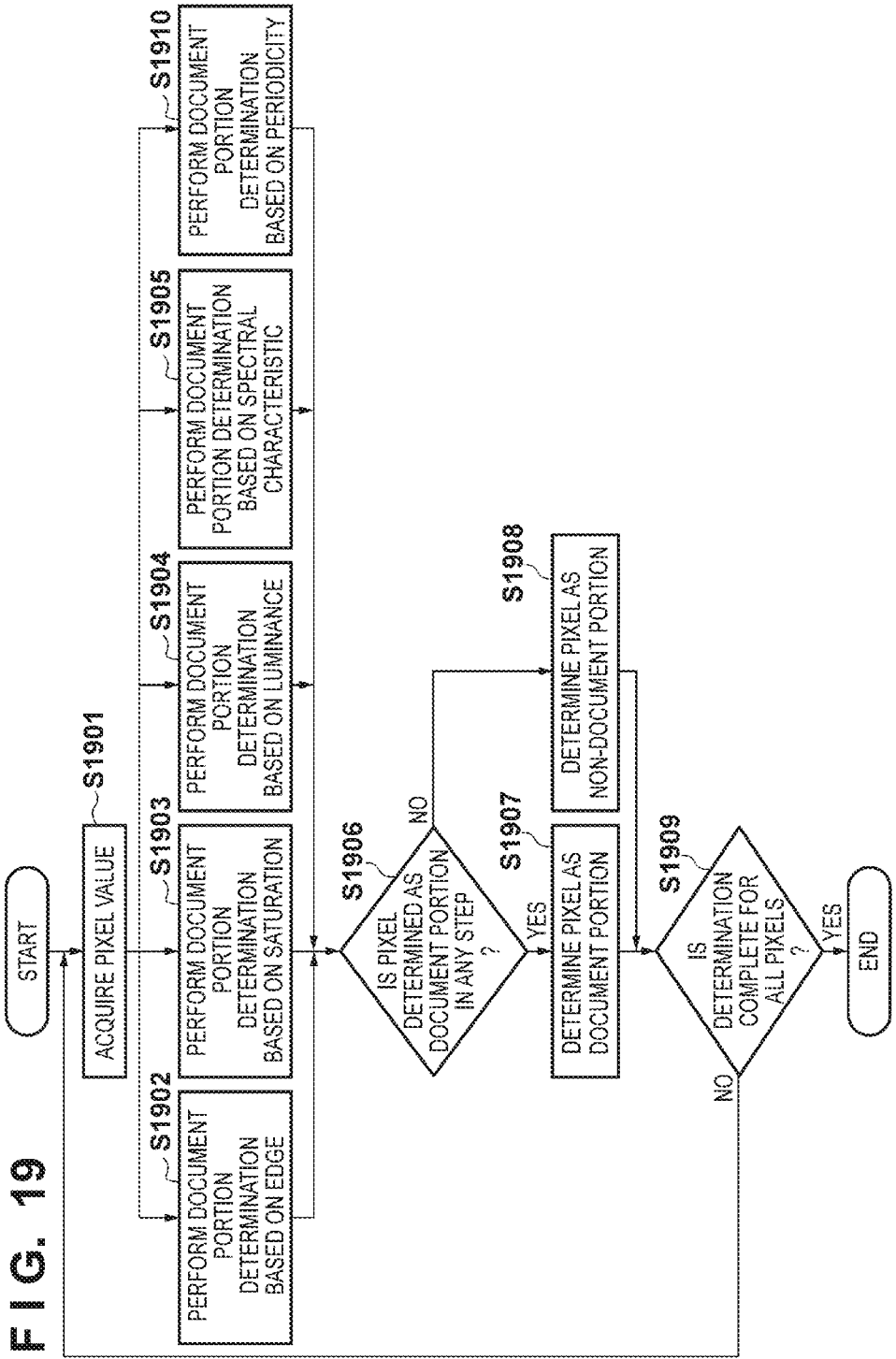
FIG. 19 is a flowchart showing other example of a procedure for pixel determination processing.

In contrast to the processing in FIG. 18, it is possible to improve the detection accuracy by increasing the number of pixel determination conditions. Steps S1901 to S1909 in FIG. 19 respectively correspond to steps S701 to S709 in FIG. 7. In addition, pixel determination processing in step S1910 is newly added to this procedure.

In step S1910, the CPU 301 detects the periodicity of a predetermined region including a target pixel. If the periodicity exhibits the characteristic of a document, the CPU 301 determines that the target pixel is a document portion. If the CPU 301 detects no periodicity, the CPU 301 determines that the target pixel is a non-document portion. In this case, the CPU 301 may use, as a periodicity detection method, a method of reading the undulation of a pixel signal in a predetermined region and determining whether the undulation coincides with a pattern. In addition, assume that the CPU 301 has extracted a spatial frequency component in the predetermined region by Fourier transform or the like and detected peak values equal to or more than a predetermined value with periodicity. In this case, the CPU 301 may determine that the predetermined region has periodicity, and that the target pixel is a document portion.

Pixel determination processing in step S1910 is based on the assumption that a pie chart, bar chart, and the like are printed on plain paper. The processing in step S1910 can be applied to any document from which periodicity can be detected, such as a document formed by offset printing with a half dot pattern.

Third Embodiment

The first and second embodiments use binary determination on whether a target pixel is a document portion. The third embodiment can further improve the accuracy by performing multilevel determination processing. Only points different from the first embodiment will be described below.

FIG. 20 is a flowchart showing a procedure for pixel determination processing in this embodiment. This processing corresponds to the pixel determination processing in step S602 in FIG. 6. Step S2001 in FIG. 20 corresponds to step S701 in FIG. 7. Step S2007 in FIG. 20 corresponds to step S709 in FIG. 7. Steps S2002 to S2005 correspond to steps S702 to S705 in FIG. 7 in terms of the evaluation values (signal values representing optical characteristics) used for processing, but differ from them in the first embodiment in terms of binarization processing executed at the last stage in each process.

FIGS. 21A to 21D are graphs for determining document degrees in steps S2002, S2003, S2004, and S2005. After the acquisition of evaluation values, the CPU 301 calculates document degrees based on the graphs respectively corresponding to them. That is, this embodiment sets two thresholds (Th1 and Th2) in advance, and defines the document degree of the target pixel from each of the graphs based on the thresholds. This embodiment obtains a document degree by performing linear interpolation between the two thresholds. However, it is possible to obtain a document degree by performing nonlinear interpolation.

Assume that in step S2006, the CPU 301 selects the maximum value of the respective document degrees obtained in steps S2002 to S2005 as the document degree of the target pixel. As is obvious from FIGS. 21A to 21D, these document degrees are multilevel values instead of binary values as in the first and second embodiments, and hence may be binarized with a predetermined threshold before combining processing or small region removal processing to be executed subsequently. Alternatively, it is possible to perform combining processing or small region removal processing without changing the multilevel values. In this case, for example, it is possible to have a parameter representing the possibility (likelihood) of a group of pixels after combining processing being a document portion. At this time, it is possible to binarize document degrees, extract a document region, and specify each coordinate like that described with reference to FIG. 17. When binarizing document degrees, it is possible to flexibly change the accuracy of cutting out document regions by variously changing a threshold as a reference. For example, it is possible to binarize multilevel document degrees by using, as a threshold, a set value for cutting accuracy setting like a slide bar operated by the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. In the case where CPU 201 has enough processing capability, CPU 201 may perform the processes shown in FIG. 4, FIG. 6, and FIG. 7 instead of CPU 301.

This application claims the benefit of Japanese Patent Application No. 2011-232115, filed Oct. 21, 2011, which is hereby incorporated by reference herein in its entirety.

What is claimed is:

1. An apparatus comprising:
an obtaining unit configured to obtain a read image which has a first area corresponding to an original placed on an original table and a second area corresponding to a cover over the original table, wherein the read image is read by a reading apparatus having the original table;
a specification unit configured to specify a signal value corresponding to each of a plurality of color components of the read image obtained by the obtaining unit; and
a determination unit configured to determine the first area distinguished from the second area by comparing at least two signal values corresponding to color components of the plurality of color components with each other.

2. The apparatus according to claim 1, wherein the specification unit specifies, in an area of the read image, the signal value corresponding to each of the plurality of color components of the read image obtained by the obtaining unit, wherein the signal value belongs to a first type of optical characteristic, and
wherein the determination unit determines the first area based on a comparison result of the at least two signal values and a signal value belonging to a second type of optical characteristic in the area.

3. The apparatus according to claim 1, wherein the signal value corresponds to a R signal or a G signal, and
wherein said determination unit determines the first area by comparing the signal value corresponding to the R signal with the signal value corresponding to the G signal.

4. The apparatus according to claim 1, wherein color of a surface of the cover which covers the original table includes white.

5. The apparatus according to claim 2, wherein the signal value belonging to the second type of optical characteristic represents at least one of saturation and luminance, and
the determination unit is configured to determine the area to be the first area, in a case where the signal value representing the saturation is larger than a threshold or the signal value representing the luminance is not larger than a threshold.

6. The apparatus according to claim 1, wherein the determination unit determines, by one pixel of the read image, whether a pixel is to be included in the first area, and
in a case where a number of pixels determined to be included in the first area is equal or larger than a predetermined number in an area, the determination unit determines the area to be the first area.

7. A method comprising:
an obtaining step of obtaining a read image which has a first area corresponding to an original placed on an original table and a second area corresponding to a cover over the original table, wherein the read image is read by a reading apparatus having the original table;
a specification step specifying a signal value corresponding to each of a plurality of color components of the read image obtained by the obtaining step; and
a determination step of determining the first area distinguished from the second area by comparing at least two signal values corresponding to color components of the plurality of color components with each other.

8. The determination method according to claim 7, wherein the reading unit reads the first area which corresponds to the original on the original table and the second area which corresponds to the cover over the original table.

9. The apparatus according to claim 2, wherein the determination unit determines the first area in a case where a comparison of the at least two signal values meets a first predetermined condition, or in a case where the signal value belonging to the second type of optical characteristic meets a second predetermined condition.

10. The apparatus according to claim 3, wherein the determination unit determines an area corresponding to a pixel of the read image to be the first area in a case where the signal value of the R signal is larger than the signal value of the G signal in the pixel.

11. The apparatus according to claim 1, wherein the determination unit determines the first area by comparing two signal values corresponding to color components of the plurality of color components with each other, wherein the two signal values correspond to two color components having different spectrum characteristics.

12. The apparatus according to claim 1, wherein the determination unit determines the first area based on a large or small relation of two signal values corresponding to color components of the plurality of color components.

13. The apparatus according to claim 1, further comprising a reading unit configured to read the original placed on the original table of the apparatus;
   wherein the obtaining unit is configured to obtain the read image read by the reading unit.

* * * * *